United States Patent [19]

Nordin

[11] Patent Number: 5,542,719
[45] Date of Patent: Aug. 6, 1996

[54] STATIONARY STANDBY SAND SPREADING UNIT FOR ROADWAYS

[76] Inventor: Harvey L. Nordin, R.R. 3, Box 351, Devils Lake, N. Dak. 58301

[21] Appl. No.: 272,222

[22] Filed: Jul. 8, 1994

[51] Int. Cl.⁶ .......................... B61C 15/10; B60B 39/00
[52] U.S. Cl. .................. 291/3; 291/47; 222/394; 239/650; 239/382
[58] Field of Search .................. 291/3, 11.1, 16, 291/41, 47; 222/394, 399, 129; 239/650, 282

[56] References Cited

U.S. PATENT DOCUMENTS

| | | | |
|---|---|---|---|
| 460,529 | 9/1891 | Evans | 291/47 |
| 1,165,331 | 12/1915 | Gray | 291/3 |
| 4,099,688 | 7/1978 | Jayne | 291/3 |
| 4,747,627 | 5/1988 | Shigeura et al. | 291/3 |
| 4,968,069 | 11/1990 | Jensen | 291/3 |

FOREIGN PATENT DOCUMENTS

| | | | |
|---|---|---|---|
| 2639515 | 3/1978 | Germany | 291/3 |
| 225465 | 12/1924 | United Kingdom | 291/3 |

Primary Examiner—S. Joseph Morano
Attorney, Agent, or Firm—Westman, Champlin & Kelly, P.A.

[57] ABSTRACT

A standby sanding unit for emergency sanding of icy roadways has a plurality of sand hoppers that are connected to a tank holding air under pressure. The hoppers have hopper type bottoms that have nozzles attached to the bottoms so that when air under pressure is provided to the upper portions of the tank, sand will be discharged out through the nozzles. The air pressure tank has valves that control the flow of air under pressure to the hoppers, when needed.

14 Claims, 3 Drawing Sheets

STATIONARY STANDBY SAND SPREADING UNIT FOR ROADWAYS

BACKGROUND OF THE INVENTION

A sand spreading unit used for emergency sanding of icy surfaces traveled by vehicles, particularly bridges which freeze before roadways as the temperature is close to freezing and dropping.

In parts of the USA where ice occurs on roadways, and when temperatures are close to the freezing mark, substantial problems are encountered across bridge decks which will freeze and form icy surfaces before the rest of the roadway. This freezing can occur suddenly, without warning, and cause numerous accidents. While sand and salt trucks can alleviate this situation, it is impossible to have trucks that will be immediately available in all areas.

Sand distributing devices which spread sand to improve traction are known, in particular vehicle sanding attachments. For example, U.S. Pat. No. 4,968,069 shows a sand dispensing device which is mounted onto a vehicle so that it will provide sand beneath the wheels of the individual vehicle. The unit is operated with air pressure from an electric air compressor wherein the air entrains the sand and directs it under the wheels. However, the individual sanders have not filled the need for rapid, emergency standby sanding of surfaces such as bridge decks that ice quickly and before the rest of the roadway.

SUMMARY OF THE INVENTION

The present invention relates to a standby sand spreading unit that can be attached to a supporting structure, such as a bridge railing or other support, and which is a self-contained spreading unit for discharging and spreading sand across an entire roadway. A pressure tank of suitable size is pressurized with air and has an outlet connected through suitable conduits to a plurality of individual sand storage hoppers or tanks. The hoppers are filled with dry sand, and have discharge tubes that are oriented in an appropriate direction for discharging and spreading sand across a roadway. The unit is operated by releasing the air pressure into the individual tanks, which creates a force on the sand and forces the sand outwardly through the discharge tubes. Alternatively, other sand discharge arrangements can be used, such as eductors, where air and sand is mixed in a mixing chamber and discharged.

The quantity of sand in the hoppers is selected so there is enough sand to form anti-skid surfaces on the ice under normal conditions, during one discharge.

After the sand has been discharged, the sand hopper will be refilled and the pressure tank recharged with air under pressure. This can be done utilizing an air tank from a truck that would also provide sand for filling the sand hoppers or tanks.

Two pipes are used in an air tank outlet line. The air under pressure can be distributed to the sand storage hoppers through a plenum.

The sand dispensing unit is self-contained, and quite easily installed on bridge decks where there is a need for standby sanding capacity because of weather conditions. The dispensing unit can be locked into place on or behind the bridge rail, or on other supports, in areas where emergency or standby sanding is required, and the valve arrangement can be suitably made to discourage vandalism and unwanted discharge of the sand. For example, a master valve controlling the air pressure can be made to be operated only by a hand operated cable or lever operated by a law enforcement person or a maintenance employee working for the highway department. This will prevent the sand from being spread until such time as the overall weather conditions warrant activating the sanding unit. Other granular material also can be added or used, such as salt pellets.

DETAILED DESCRIPTION OF THE PREFERRED EMBODIMENTS

Figure 1:
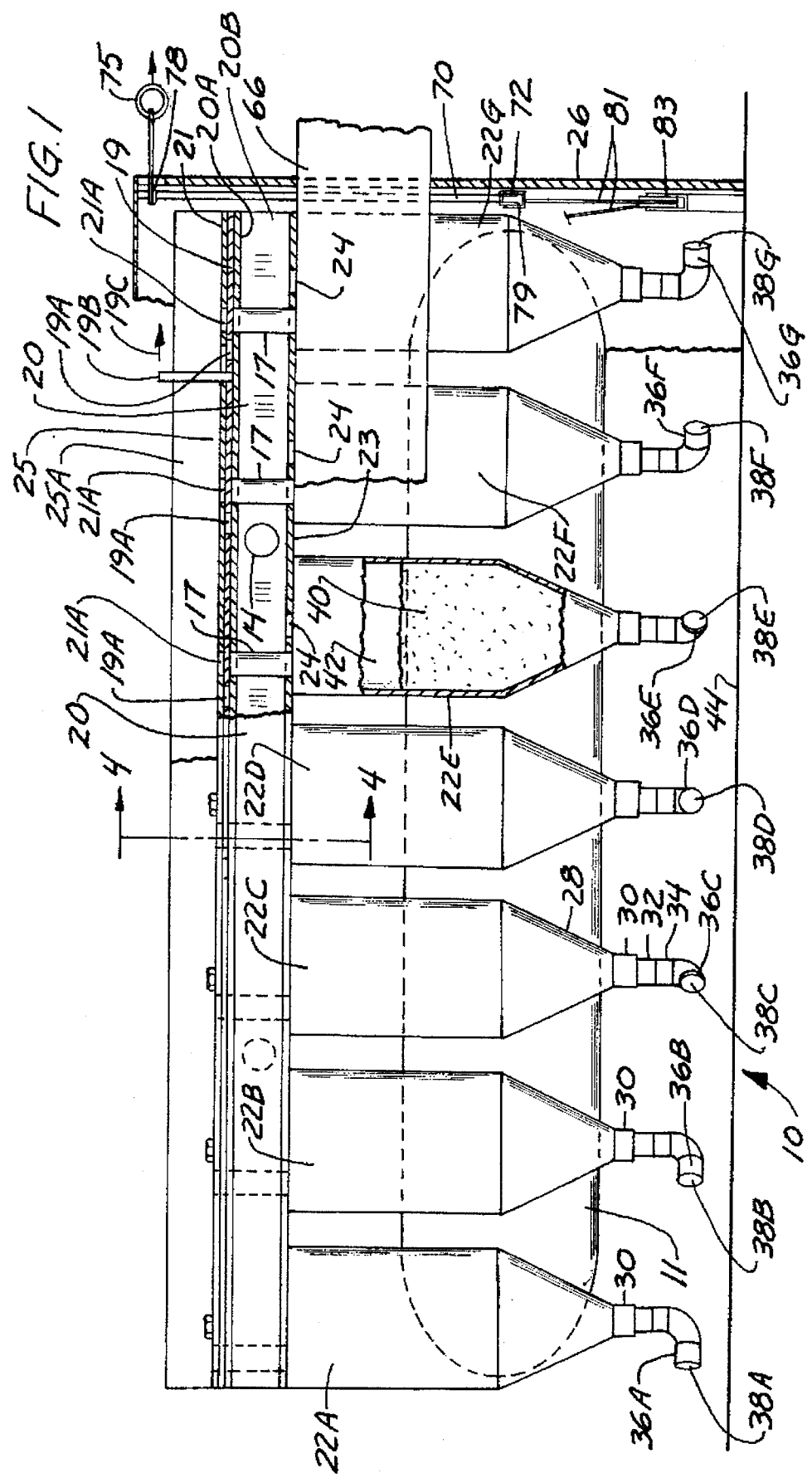
FIG. 1 is a side elevational view of a standby sand unit made according to the present invention with outer supports rewound and parts broken away.

FIG. 1 illustrates a standby spreading apparatus 10 with a fragmentarily shown outer housing 26 that can be utilized or removed, and with other parts also removed.

The standby sand spreading apparatus 10 includes an air pressure tank 11 for storing air under pressure. The pressure tank 11 can be of suitable volume, and capable of withstanding ordinary line pressures. As shown it is elongated with its longitudinal axis or length extending parallel to the direction of travel of a vehicle on the roadway. Pressures in the range of 125 to 200 psi would be the initial starting pressures in this system. The air tank 11 has a pair of outlet tubes 14 that are connected to the tank, and are joined through elbows 16 to a manifold 20. The manifold 20 is an elongated rectangular or other suitable cross section chamber that extends in longitudinal direction of the tank 11. Flow of air from the tank 11 is controlled by a manual valve 18 in each outlet tube 14. The valves are manual valves having levers 15 that are preferably controlled by a common actuator bar 15A connected to both levers 15.

Figure 2:
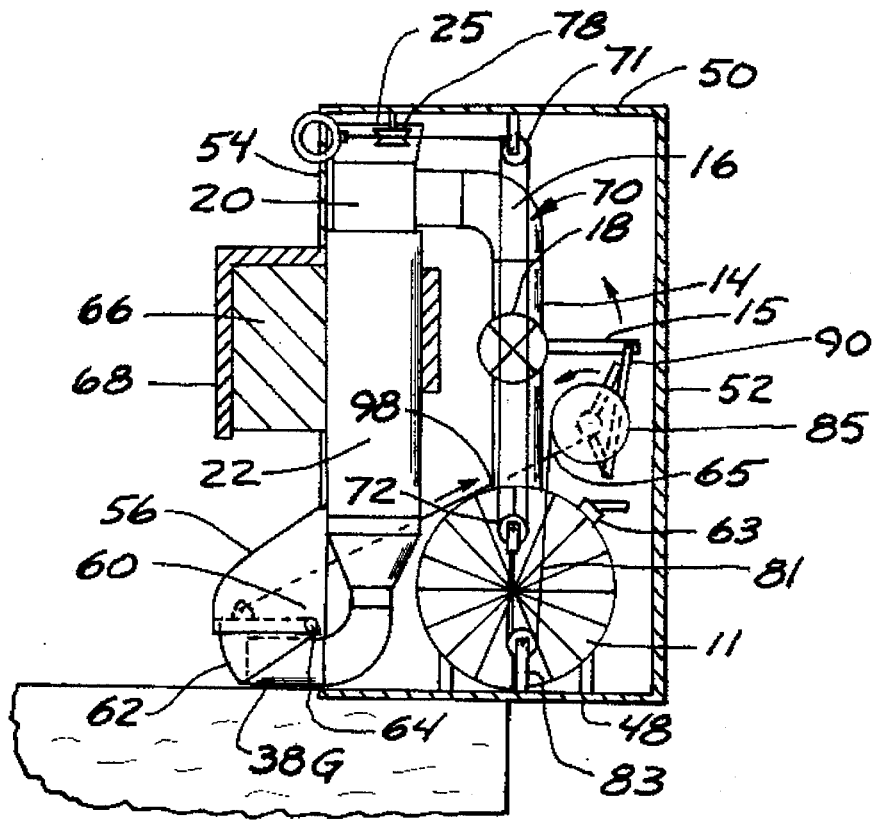
FIG. 2 is an end view of the unit of FIG. 1 shown installed on a bridge rail.

A plurality of individual sand hoppers 22A through 22G are provided and mounted along the longitudinal length of the tank and just below the plenum as shown in FIGS. 1 and 2. While the hoppers are shown in FIG. 2 as being mounted on an outer frame or housing 26, the mounting could be cross frame members extending and supporting each of the sand hoppers as a unit or individually, and include a suitable frame support for the air tank 11 as well.

Figure 4:
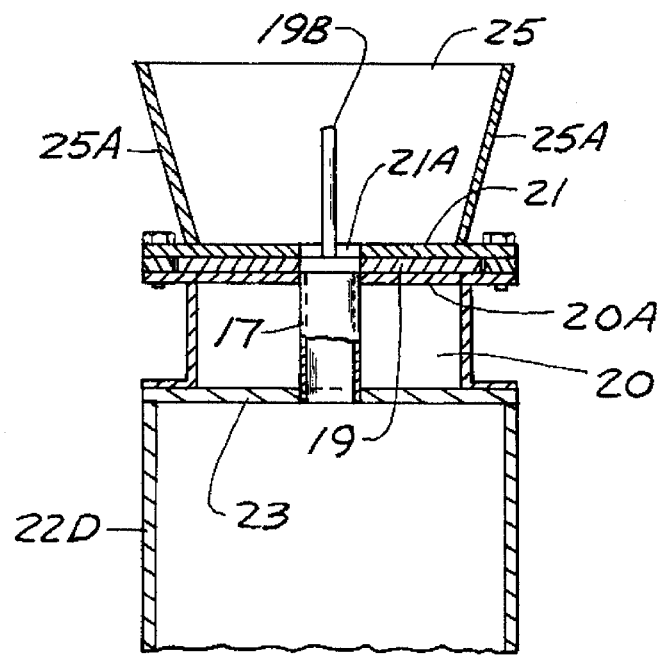
FIG. 4 is an enlarged sectional view taken on line 4–4 in FIG. 1.

The sand is filled into the hoppers through individual fill pipes indicated at 17 that open through a wall 23 that can be placed across the tops of the hoppers, and that forms the bottom of the plenum 20. These fill pipes 17 extend upwardly and are joined to openings in a plenum top wall at 20A, which in turn is supported on suitable side walls 20B. The top wall 20A (see also FIG. 4) supports a valving slide plate 19 that is slidably mounted on top of the wall 20A and is held in place below a retainer plate 21 which is spaced upwardly from the wall 20A along its edges sufficiently to permit the slide plate 19 to be slid in the longitudinal direction. The slide plate 19 acts as a closing valve for the sand fill pipes 17, and has a plurality of openings 19A which in the position shown in FIG. 1 are offset from the openings of the fill pipes 17, and when a handle 19B is slid in direction as shown by the arrow 19C, the openings 19A will come into registry with the tops of the fill pipes 17, as well as with an inlet opening 21A that is aligned with each of the fill pipes 17 in the retainer plate 21. A suitable supply hopper 25 is formed by providing side walls 25A, end walls and divider walls, if desired, that are attached along the edges of the retainer plate 21.

The slide plate 19 will sufficiently close the fill pipes 17 when slid to the position shown in FIG. 1 so that when air is introduced into the plenum chamber 20 the pressure in the sand hoppers 22A–22G will not be permitted to dissipate through the sand fill pipes 17.

When the openings 19A are in registry with the fill pipes 17, sand can be filled into the supply hopper 25, in order to fill all of the sand hoppers as desired, and to the level desired. Other suitable types of sand fill openings and other suitable types of plenums also can be used.

The sand hoppers 22A–22G have air inlet openings 24 leading through wall 23 from the plenum 20 as shown in FIG. 1. The sand hoppers 22A–22G are enclosed, generally upright cylindrical hoppers having hopper bottoms 28 which taper down toward outlet couplings 30. The outlet couplings 30 in turn attach to separate discharge pipes 32 through swivel or elbow connections 34 to sand discharge nozzles 36A through 36G.

Figure 3:
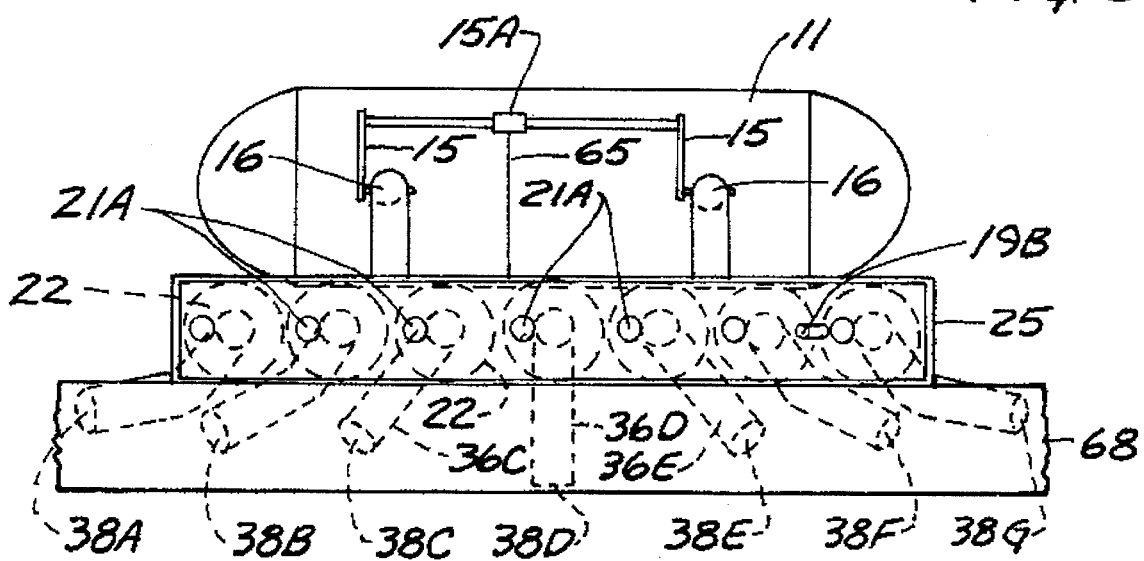
FIG. 3 is a top plan view of the standby sanding unit of FIG. 1.

In FIGS. 1 and 3 the nozzles 36A–36G are shown directed in different directions relative to the direction of travel of vehicles past the sand hoppers, so that their outer ends 38A–38G respectively, are directed to provide a fan shaped discharge of the sand, as can be seen in FIG. 3. The swivel elbow connections 34 permit movement of the nozzles. The swivel elbows are standard fittings for pipe used for carrying the sand. If threaded connections are used, the elbows are threaded to the pipes 32 and can be turned on the threads to the desired orientation. The sand is retained in the sand hoppers 22A–22G without any valves in the hopper outlets. The swivel elbow connections 34 block sand flow until air pressure is applied to the sand hoppers.

As shown at 40 in FIG. 1, the sand filling inside the sand hoppers may leave an airspace 42 above the sand, although the sand hoppers can be filled full if desired. When the air valves 18 are opened which can be done by operating a lifting bar 15A (FIG. 3) and moving both levers 15 simultaneously to open both valves 18 at once, or using a cable and pulley arrangement as shown and explained subsequently in connection with FIGS. 2 and 5, air under pressure will be provided to the airspace 42 in each of the sand hoppers 22A–22G causing the sand to be blown outwardly through the discharge couplings 30, and through the tubes 32 and the swivel elbow connections 34 out into the discharge nozzles 36A–36G. The air pressure will cause the sand to be moved under pressure with a sufficient force to scatter it laterally across a roadway illustrated generally at 44 and provide a sanded surface for traction to reduce slippery conditions and provide for traction of vehicles.

As shown in FIG. 2, if desired, the outer housing 26 has a floor 48, a top wall 50, and front and rear walls 54 and 52 as well as suitable end walls. Wall 54, which faces the surface to be sanded, supports protective covers for the nozzle. A first cover 56 is fixed to front wall 54 and extends out from the front wall 54. It forms a chamber below the wall 56. There are end support walls 60 that support the first cover. A second movable cover 62 is pivotally mounted as at 64 to the end walls 60 of the first cover 56 and cover 62 can be pivoted upwardly out of the way for clearance of the respective discharge nozzles. The covers 56 and 62 reduce the likelihood of damage that might be caused by vehicles that might try to drive over the unit and also protect the traffic from damage if cars hit the unit.

The frame or housing 26 can be put into place, and a fill valve 63 provided so that the pressure tank 11 can be charged with air under pressure. The rear wall 52 can be removed or can have large access panels so the air tank and the rest of the components can be serviced and so the valves can be manually operated. The sand hoppers have openable and closable fill ports, as explained so that the hoppers 22A–22G can be recharged with sand, and yet will maintain an airtight seal.

As a primary intended use, the standby sander apparatus 10 is placed on a bridge deck 44, and suspended or supported on a bridge rail 66 that is shown only schematically, by use of suitable brackets 68 (FIG. 2). These brackets 68 can be locked back onto the housing, if the housing 26 is used, or onto a provided support frame for the sand hoppers 22 and air tank 11. The connections can be made so that air pressure will be retained for a substantial length of time and the air tank 11 only has to be charged infrequently. Of course once the sander apparatus has been operated, the sand hoppers have to be refilled with sand and the air tank recharged.

From a size standpoint, generally speaking, each sand hopper is in the range of 6 inches in diameter and with a length of 24 inches to hold a satisfactory amount of sand, for at least one operation.

Direct air pressure acting on dry sand as shown will force the sand through the elbow swivels 34 and discharge nozzles 38A–38G with sufficient force to spread it in an area of in the range of 40 feet wide and 80 feet long. Other forms of sand dispersion could be utilized such as eductors that mix the sand and air in housings at the bottom of the hopper. The air pressure can be used to push a piston in a tube to expel the sand. If it is desirable to have a self-contained unit that requires no external power, manually actuated air valves are desired.

Figure 5:
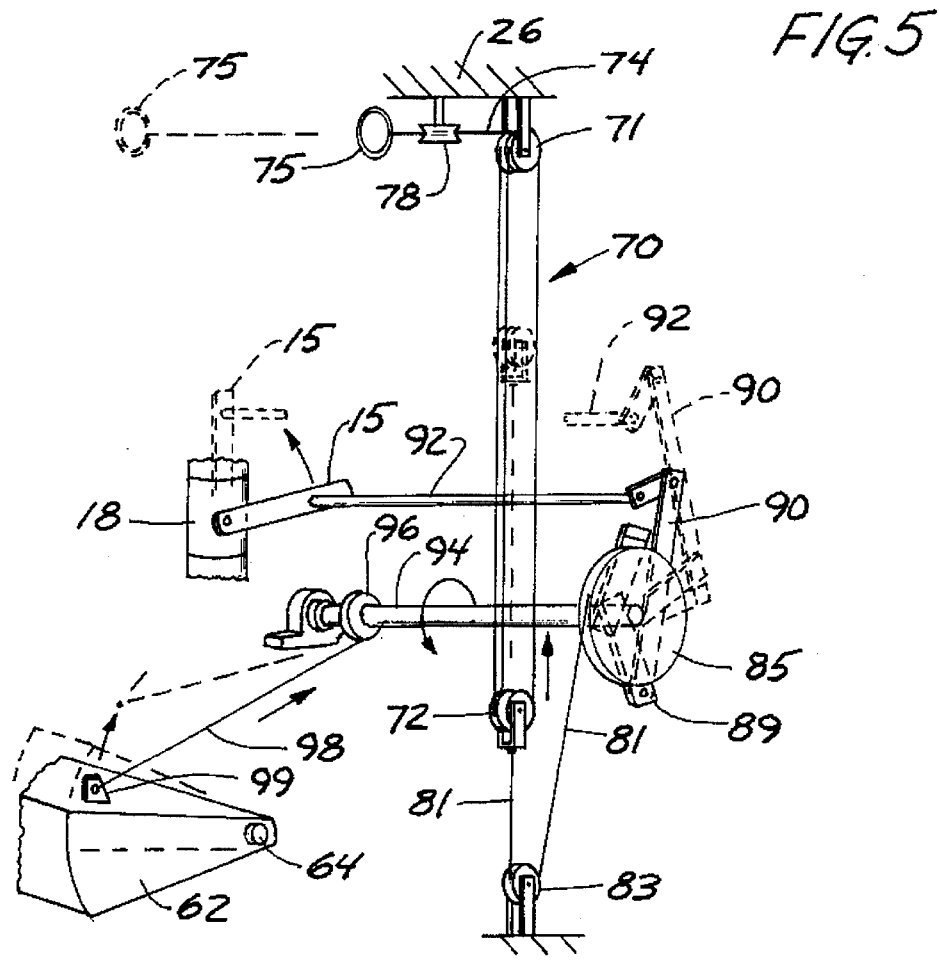
FIG. 5 is a schematic representation of a cable arrangement for operating valves used with the present invention.

While the manual bar 15A can be used for operating the valves 18, by direct lifting of the actuator bar 15A that is connected to both levers 15, there has been a desire to provide a valve actuator that would permit the operator to be spaced some distance from the discharge region of the sander at the time the valves are opened and the sand discharges. Also, while a pull cable 65 between the actuator bar 15A and the pivoting cover 62 will provide for lifting the cover 62 at the same time the levers 15 are moved to open the valves 18, a modified structure shown generally and schematically in FIGS. 2 and 5 provide some mechanical advantage for lifting the levers 15, and also provide for pivoting the movable cover 62.

The showing of the operator is schematic to illustrate the principle of operation. Referring first to FIG. 5, a cable arrangement for operating the valves 18 through the levers 15 is shown generally at 70. The cable arrangement is placed at one end of the housing 26, as shown fragmentarily in FIG. 1. The cable arrangement includes a first pulley assembly 71, and a second pulley assembly 72 that is a conventional multi-strand, force multiplying block and tackle, having an actuator cable end 74 with a pull ring 75. The actuator or pull cable end 74 passes over a guide pulley 78 that rotates about a vertical axis so that the cable end 75 can be pulled laterally out of the housing 26, through a provided opening. The opening can be closed with a cover or it could be merely left open.

The lower or second pulley assembly 72 has its pulleys rotatably mounted on a bracket 79 which is attached to an actuator cable 81. The actuator cable passes under a lower pulley 83 that is supported on the housing. As shown in FIG. 2, the cable 81 passes back up over a V-belt actuator sheave or pulley 85 that is coupled to a rotatable shaft 94. The free end of the actuator cable 81 is pinned to the pulley 85 in a desired location around the periphery around the actuator pulley 85, so that as the cable 74 is pulled, the lower pulley assembly 72 will be raised upwardly toward the upper of first pulley assembly 71. The lower pulley assembly may move half the distance the ring 75 is moved, or some other fraction of the distance, depending on the cabling. The cabling also provides force multiplication, as is well known.

As the lower pulley assembly 72 moves upward, the actuator cable end 81 pulls on the actuator pulley 85 which will then rotate and will move a crank arm 89 that is driven by the pulley 85, which in turn is pivotally connected to one end of a link 90, that has an end member connected to the outer end of a cross rod 92 of suitable strength that extends laterally and is attached to both of the valve actuating levers 15. Only one valve actuating lever 15 is shown in FIG. 5 in particular, but the rod 92 extends between the levers 15, as does the rod 15A shown in FIG. 3 for manual operation.

As the sheave 85 rotates, it rotates shaft 94 which is rotatably mounted in suitable bearings on the housing 26. The shaft 94 is attached to supports or brackets from a wall or the floor of the housing. The rotation of shaft 94 drives a sprocket 96 which in turn drives a chain shown schematically at 98. The chain 98 is attached to an ear 99 on the pivoting cover 62, and as the pulley 85 rotates, the shaft 94 will rotate in direction as indicated by the arrow 100 and the rotation of the sprocket 96 will shorten chain 98 to lift cover 62 about its pivot 64 as the levers 15 are raised to their valve open position as shown in dotted lines in FIG. 5.

By the time the levers 15 have been raised far enough to open valves 18, the operator that is pulling on the ring 75 will have moved a distance laterally away from the sander to avoid any dust or interference from the sander.

A manual handle 102 is attached to the drive pulley 85 as well, and this is used for resetting the system manually by rotating the pulley 85 back to its original position wherein the crank arm 89 and link 90 will be moved to their original position shown in solid lines in FIG. 5 instead of the dotted line position. Selection of the sizes of the pulley 85 and sprocket 96 insure that the movements are adequate to operate the valves 18 and open cover 62.

When the manual cross rod 15A is used it is lifted by an operator. The cable 65 can be attached directly to the cross rod 15A so that as the rod is lifted, the pivoting cover 62 will be raised as well. Raising of the cross rod 15A generally will provide enough movement to lift the cover 62 to uncover the conduits that discharge the sand. The rear wall 52 of the housing 26 may have an access panel for operating the valves, or be removable entirely.

The bracket for affixing the sand distributor unit to the bridge guard rail permits positioning the nozzles in a very desirable location and supporting the sand distributor in a way so that it can be locked into place and cannot be removed.

The present invention discloses a stationary auxiliary or standby sander that distributes the sand across a roadway, and will have sufficient force so that having the unit on one side of a roadway will spread it across a two-lane roadway with no problem.

Various actuators for the valves 18 can be provided. The pivoting of the cover 62 can be controlled by a chain or cable pulled manually or connected to the actuator for the valves 18, as shown, so that the nozzles 38 are exposed and open when the air pressure is turned on.

Although the present invention has been described with reference to preferred embodiments, workers skilled in the art will recognize that changes may be made in form and detail without departing from the spirit and scope of the invention.

What is claimed is:

1. A stationary distributor of discrete particles for providing such particles for use on slippery road surfaces comprising:

a frame for stationarily supporting the distributor relative to a fixed surface adjacent a roadway subjected to periodic slippery conditions;

an air storage tank mounted on the frame;

a plurality of hoppers mounted on the frame adjacent to said tank;

a quantity of discrete particles in each of the hoppers, to at least partially fill the hoppers;

an air pressure inlet connected to each hopper for receiving air pressure from the tank and exerting pressure on the particles in the hopper; and an outlet from each of the hoppers including a particle discharge nozzle for directing particles onto and across a road surface adjacent to which the tank and hoppers are mounted.

2. The distributor of claim 1 and a movable cover mounted to overlie the outlet of each hopper.

3. The distributor of claim 1, wherein said discharge nozzles are mountable to direct discharging particles in a desired direction.

4. The distributor of claim 1, wherein the plurality of hoppers are positioned adjacent each other and extending along a longitudinal length of the air tank, and an air pressure manifold connected between the air storage tank and the air pressure inlets to the hoppers.

5. The distributor of claim 1 wherein the distributor includes a support bracket on the frame for mounting the distributor onto a bridge railing.

6. The distributor of claim 1 wherein the air tank and hoppers are mounted within a housing comprising the frame, the housing being mounted adjacent a road surface.

7. A standby sand distributor for providing sand across slippery roadway surfaces comprising:

a frame having supports for mounting the distributor along a side of a roadway surface;

an elongated air pressure tank mounted on said frame and extending generally parallel to the direction of movement of traffic on the roadway surface;

a plurality of hoppers mounted on said frame and coupled to said air tank, each of said hoppers having a generally upright tank and a hopper bottom for holding a quantity of sand and being positioned side by side along the length of the air pressure tank;

a separate discharge nozzle connected to each of the hoppers at a lower portion of the hopper bottom and each nozzle being oriented at a selected direction to provide a pattern of coverage of a greater length than the length of the plurality of hoppers in a direction along the tank; and a valve for controlling flow of air under pressure provided by said tank to upper portions of the hoppers to provide a fan-shaped discharge of sand moving laterally across a roadway alongside of which the frame is mounted when air pressure is provided to the hoppers.

8. The sand distributor of claim 7 wherein the outlets from the hopper bottoms comprise a swivel connection for permitting directing sand discharging from the discharge nozzles of the hoppers at different selected angles about generally upright axes.

9. The sand distributor of claim 7 wherein the plurality of hoppers are positioned side by side along the length of the air pressure tank, and each of the hoppers has its nozzle directed in a different orientation relative to the direction of travel of vehicles moving parallel to the longitudinal axis of the tank, to provide a fan shaped discharge of sand moving laterally across the roadway when air pressure is provided to the upper portions of the hoppers.

10. A standby sand distributor for providing sand across slippery roadway surfaces comprising:

a frame;
 an elongated air pressure tank mounted on said frame and extending generally in the direction of movement of traffic on the roadway;
 a plurality of hoppers mounted on said frame and coupled to said air tank, each of said hoppers having a generally upright tank and a hopper bottom for holding a quantity of sand;
 a separate discharge nozzle connected to each of the hoppers at a lower portion of the hopper bottom;
 an air plenum having outlets leading to upper portions of the hoppers;
 a pair of tubes connecting the air tank to the plenum; and
 a valve in each of the tubes for controlling flow of air under pressure provided in said tank to the upper portions of the hoppers.

11. The sand distribution of claim 10 wherein the tubes have manually operable valves therein with actuating levers for the valves, and a connection bar for simultaneously operating the levers.

12. A method of providing discrete particles for reducing the slipperiness of an icy roadway comprising the steps of:

stationarily mounting air storage tank adjacent to the roadway;
 providing a plurality of hoppers having outlet nozzles and at least partially filled with a quantity of discrete particles used for reducing slipperiness;
 positioning said nozzles adjacent a roadway and oriented to direct discrete particles discharging from said nozzles across the roadway; and
 selectively providing air pressure from the tank to each of said hoppers to expel the discrete particles from said hoppers through the nozzles and across the roadway.

13. The method of claim 12, including the step of mounting the air tank and hoppers onto a bridge railing positioned laterally of the roadway.

14. The method of claim 12 including the step of providing discrete particles of sand for at least partially filling the hopper.

* * * * *